United States Patent
Nagashima et al.

(10) Patent No.: US 10,752,283 B2
(45) Date of Patent: Aug. 25, 2020

(54) ELECTRIC POWER STEERING APPARATUS

(71) Applicant: Mitsubishi Electric Corporation, Tokyo (JP)

(72) Inventors: Tomohiko Nagashima, Tokyo (JP); Akihiko Mori, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 16/303,830

(22) PCT Filed: Sep. 5, 2016

(86) PCT No.: PCT/JP2016/075990
§ 371 (c)(1),
(2) Date: Nov. 21, 2018

(87) PCT Pub. No.: WO2018/042657
PCT Pub. Date: Mar. 8, 2018

(65) Prior Publication Data
US 2019/0291778 A1    Sep. 26, 2019

(51) Int. Cl.
*B62D 5/04* (2006.01)
*H02P 25/16* (2006.01)
(Continued)

(52) U.S. Cl.
CPC ............ *B62D 5/0487* (2013.01); *B62D 5/04* (2013.01); *B62D 5/0403* (2013.01);
(Continued)

(58) Field of Classification Search
CPC ... B62D 5/04; B62D 5/05; B62D 5/06; B62D 5/10; F02P 25/16; F02P 25/22; F02P 27/08; H02K 7/14; H02K 11/33; H02K 5/22
(Continued)

(56) References Cited

U.S. PATENT DOCUMENTS

2005/0159866 A1    7/2005  Takeuchi et al.
2006/0001392 A1*   1/2006  Ajima ................ B62D 5/0463
                                                              318/432
(Continued)

FOREIGN PATENT DOCUMENTS

JP        3839358 B2      11/2006
JP      2009-161156 A      7/2009
(Continued)

OTHER PUBLICATIONS

Communication dated Dec. 3, 2019, from the Japanese Patent Office in counterpart application No. 2018-536664.
(Continued)

*Primary Examiner* — Tan Q Nguyen
(74) *Attorney, Agent, or Firm* — Sughrue Mion, PLLC; Richard C. Turner (57) ABSTRACT

Two sets of independent armature windings and two sets of control units are provided; a single power-source connector branches into at least four lines in the vicinity of a power-source terminal; a power source relay, a filter, and an inverter circuit are connected, in that order, with a line where a large current flows; a control circuit unit is connected with a line where a small current flows and a detection circuit for detecting an abnormality in the control circuit unit is provided in that line.

20 Claims, 4 Drawing Sheets

(51) Int. Cl.
　　　*H02K 11/33*　　　(2016.01)
　　　*H02P 29/024*　　　(2016.01)
　　　*H02P 29/032*　　　(2016.01)
　　　*H02K 5/22*　　　(2006.01)
　　　*H02K 7/14*　　　(2006.01)
　　　*H02P 25/22*　　　(2006.01)
　　　*H02K 7/00*　　　(2006.01)

(52) U.S. Cl.
　　　CPC ........... *B62D 5/0406* (2013.01); *B62D 5/046* (2013.01); *B62D 5/0481* (2013.01); *H02K 5/225* (2013.01); *H02K 7/00* (2013.01); *H02K 7/14* (2013.01); *H02K 11/33* (2016.01); *H02P 25/16* (2013.01); *H02P 25/22* (2013.01); *H02P 29/025* (2013.01); *H02P 29/0241* (2016.02); *H02P 29/032* (2016.02); *H02K 2211/03* (2013.01)

(58) Field of Classification Search
　　　USPC ......................................................... 701/41
　　　See application file for complete search history.

(56) References Cited

U.S. PATENT DOCUMENTS

2008/0191655 A1\* 8/2008 Ueda .................... B62D 5/0487
　　　　　　　　　　　　　　　　　　　　　318/609
2017/0217481 A1　　8/2017　Asao et al.

FOREIGN PATENT DOCUMENTS

WO　　2006/117865 A1　　11/2006
WO　　2016/063367 A1　　4/2016

OTHER PUBLICATIONS

Communication dated Jun. 25, 2019 from Japanese Patent Office in counterpart JP Application No. 2018-536664.
International Search Report of PCT/JP2016/075990 dated Nov. 15, 2016 [PCT/ISA/210].

\* cited by examiner

ELECTRIC POWER STEERING APPARATUS

CROSS REFERENCE TO RELATED APPLICATIONS

This application is a National Stage of International Application No. PCT/JP2016/075990, filed Sep. 5, 2016.

TECHNICAL FIELD

The present invention relates to an electric power steering apparatus in which an electric motor produces assist torque for assisting steering torque produced by a vehicle driver and more particularly to an electric power steering apparatus in which each of an electric motor and a control unit as a controller for controlling the motor has redundancy.

BACKGROUND ART

To date, in electric power steering apparatuses in each of which an electric motor produces assist torque for assisting steering torque produced by a vehicle driver, there exists an electric power steering apparatus in which there is provided an electric motor having two sets of armature windings that are formed substantially in the same manner and in which an inverter circuit that can separately drive the two sets of armature windings is provided in a control unit. At a normal time, the conventional electric power steering apparatus configured in such a manner as described above makes two sets of inverter circuits collaborate with each other so as to control the electric motor; however, in the case where an abnormality occurs in one of the two sets of inverter circuits, only the other normal inverter circuit continues driving of the electric motor.

To date, there has been disclosed an electric power steering apparatus in which the control-unit constituent elements, other than the inverter circuit, are made to be a double system so that the redundancy is raised and hence the countermeasure for a failure is further enriched (for example, refer to Patent Document 1). In the conventional electric power steering apparatus disclosed in Patent Document 1, not only two sets of armature windings of an electric motor are provided but also two sets of control units, each of which has a +B power source to be connected with the positive-polarity electrode of a vehicle battery, an input circuit, a CPU, an output circuit, and the like, are provided; in the case where an abnormality occurs in one of the two sets of control units, the other normal one thereof can continue driving of the electric motor.

PRIOR ART REFERENCE

Patent Document

[Patent Document 1] Japanese Patent Publication No. 3839358

DISCLOSURE OF THE INVENTION

Problems to be Solved by the Invention

Because the conventional electric power steering apparatus disclosed in foregoing Patent Document 1 is provided with two sets of armature windings and two sets of control units, the adaptability for a failure can be raised; however, in terms of the capability of being mounted in a vehicle and the cost, it is often disadvantageous to provide the two sets of control units so as to secure the redundancy. Accordingly, it is required to secure the redundancy while taking both the cost-performance and the safety into consideration. In particular, as the number of connectors increases, not only the number of harness that engage with the connectors increases but also the area necessary for electrical connection from the connector terminal to the circuit network becomes double in comparison with the case where only one set of control unit is provided. Moreover, because the inverter circuit performs switching of a large current, improvement is required in taking countermeasures for noise emitted from the control unit.

The present invention has been implemented in order to solve the foregoing problem in the conventional electric power steering apparatus; the objective thereof is to provide an electric power steering apparatus that can simplify the circuitry in the vicinity of a connector and can suppress noise from being emitted, while having redundancy.

Means for Solving the Problems

An electric power steering apparatus according to the present invention includes an electric motor that produces assist torque, based on steering torque produced by a driver of a vehicle, a controller that controls the electric motor, and a power-source connector that is connected with a battery mounted in the vehicle and supplies respective power sources to the controller and the electric motor; the electric power steering apparatus is characterized in that the electric motor is provided with two sets of armature windings including a first armature winding and a second armature winding that are formed in substantially the same manner, in that the controller is formed of two sets of controllers that are formed in substantially the same manner and that include a first controller formed in such a way as to be capable of independently controlling the first armature winding and a second controller formed in such a way as to be capable of independently controlling the second armature winding, in that each of the first controller and the second controller has a power source relay formed in such a way as to be capable of turning on/off a power source, a filter circuit connected with the power source relay, an input circuit to which information from a sensor is inputted, a driving circuit that generates a driving signal for driving the electric motor, an inverter circuit that is controlled by the driving signal, and a control circuit provided with a CPU that outputs to the first driving circuit a command signal for controlling the electric motor based on the information inputted to the input circuit, in that the power-source connector is formed of a single connector, in that out of terminals of the power-source connector, a power source system to be connected at least with the positive-polarity side of the battery branches into two lines in the immediate vicinity of the terminals; one of the branch lines is connected with the first controller and the other one of the branch lines is connected with the second controller, in that each of the two branch lines further re-branches into two lines, in that the power source relay, the filter circuit, and the inverter circuit are connected with one of the re-branch lines, and in that the control circuit is connected with the other one of the re-branch lines by way of a first detection circuit that detects an abnormality in a circuit connected with the control circuit.

Advantage of the Invention

An electric power steering apparatus according to the present invention makes it possible that only the line of the system in which an abnormality occurs is cut off and control of an electric motor is continued through a normal line.

BEST MODE FOR CARRYING OUT THE INVENTION

Embodiment 1

Figure 1:
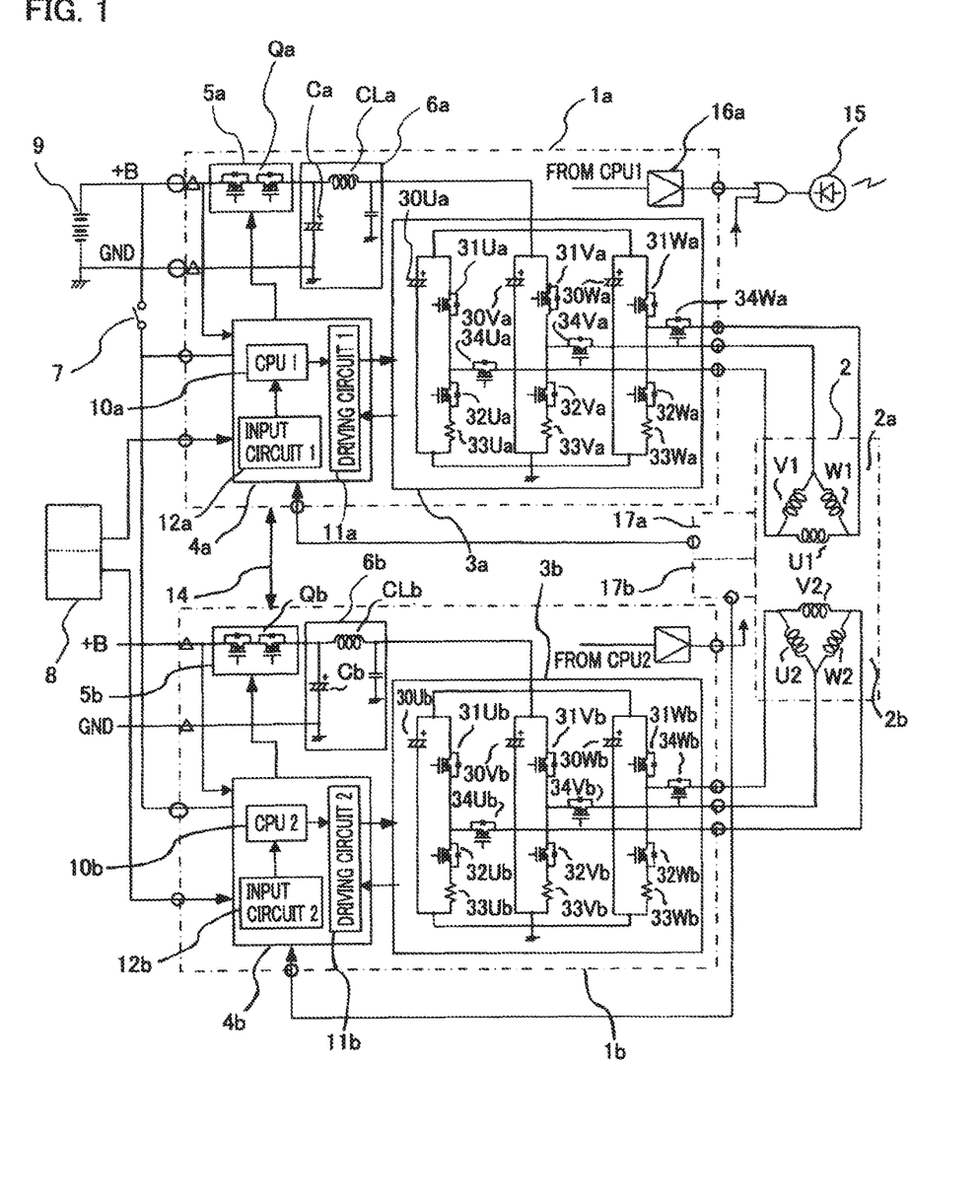
FIG. 1 is an overall circuit diagram of an electric power steering apparatus according to Embodiment 1 of the present invention.

Hereinafter, an electric power steering apparatus according to Embodiment 1 of the present invention will be explained with reference to the drawings. FIG. 1 is an overall circuit diagram of the electric power steering apparatus according to Embodiment 1 of the present invention. In FIG. 1, an electric motor 2 that produces assist torque for assisting steering torque produced by a vehicle driver has two sets of armature windings including a three-phase first armature winding 2a and a three-phase second armature winding 2b. The first armature winding 2a and the second armature winding 2b are configured substantially in the same manner; however, they are arranged in such a way as to be shifted by 120° electric angle from each other.

Two sets of control units as two sets of controllers including a first control unit 1a as a first controller and a second control unit 1b as a second controller are each configured with the same constituent members; thus, they are configured substantially in the same manner. The first control unit 1a can independently supply electric power to the first armature winding 2a; the second control unit 1b can independently supply electric power to the second armature winding 2b. The marks "o" in FIG. 1 denote respective connection terminals in the first control unit 1a and the second control unit 1b.

At first, the first control unit 1a out of the two sets of control units will be explained. The first control unit 1a is provided with a first control circuit unit 4a as a first control circuit equipped with a first CPU (central processing unit) 10a, a first inverter circuit 3a that supplies an electric current to the first armature winding 2a of the electric motor 2, a first power-source relay 5a, and a first filter circuit 6a. The first control unit 1a is connected with a +B power source, connected with the positive-polarity electrode of a battery 9 mounted in a vehicle, and a ground terminal GND, which is the negative-polarity terminal of the battery 9. In the first control unit 1a, the first control circuit unit 4a is connected with a power source through an ignition switch 7; moreover, information pieces, for example, from a torque sensor that is mounted in the vicinity of the handwheel of the vehicle and detects steering torque, a speed sensor that detects the traveling speed of the vehicle, and the like are inputted from sensors 8 to the first control circuit unit 4a.

The information pieces from the sensors 8 are transferred to the first CPU 10a by way of a first input circuit 12a provided in the first control circuit unit 4a. From those transferred information pieces, the first CPU 10a calculates a current value, which is a control amount for rotating the electric motor 2, and then outputs an output signal corresponding to the calculation value. The output signal from the first CPU 10a is transferred to a first driving circuit 11a forming a first output circuit and to the first inverter circuit 3a. The first driving circuit 11a receives a first command signal, which is the output signal from the first CPU 10a, and then outputs a first driving signal for driving after-mentioned switching devices in the first inverter circuit 3a. Because only a small current flows in the first driving circuit 11a, the first driving circuit 11a is mounted in the first control circuit unit 4a, in Embodiment 1; however, the first driving circuit 11a can be disposed also in the first inverter circuit 3a.

The first inverter circuit 3a is formed of a three-phase bridge circuit and is provided with a U-phase arm including a U-phase upper arm switching device 31Ua and a U-phase lower arm switching device 32Ua that are connected in series with each other, a V-phase arm including a V-phase upper arm switching device 31Va and a V-phase lower arm switching device 32Va that are connected in series with each other, and a W-phase arm including a W-phase upper arm switching device 31Wa and a W-phase lower arm switching device 32Wa that are connected in series with each other.

The series connection portion between the U-phase upper arm switching device 31Ua and the U-phase lower arm switching device 32Ua is connected with a U-phase winding U1 of the first armature winding 2a by way of a U-phase motor relaying switching device 34Ua. The series connection portion between the V-phase upper arm switching device 31Va and the V-phase lower arm switching device 32Va is connected with a V-phase winding V1 of the first armature winding 2a by way of a V-phase motor relaying switching device 34Va. The series connection portion between the W-phase upper arm switching device 31Wa and the W-phase lower arm switching device 32Wa is connected with a W-phase winding W1 of the first armature winding 2a by way of a W-phase motor relaying switching device 34Wa.

A U-phase shunt resistor 33Ua for detecting a U-phase current is connected in series with the U-phase lower arm switching device 32Ua; A V-phase shunt resistor 33Va for detecting a V-phase current is connected in series with the V-phase lower arm switching device 32Va; A W-phase shunt resistor 33Wa for detecting a W-phase current is connected in series with the W-phase lower arm switching device 32Wa.

A U-phase noise suppression capacitor 30Ua is connected in parallel with the U-phase arm including the U-phase upper arm switching device 31Ua and the U-phase lower arm switching device 32Ua; A V-phase noise suppression capacitor 30Va is connected in parallel with the V-phase arm including the V-phase upper arm switching device 31Va and the V-phase lower arm switching device 32Va; A W-phase noise suppression capacitor 30Wa is connected in parallel with the W-phase arm including the W-phase upper arm switching device 31Wa and the W-phase lower arm switching device 32Wa.

Respective potential differences across the D-phase shunt resistor 33Ua, the V-phase shunt resistor 33Va, and W-phase shunt resistor 33Wa and respective voltages at the winding terminals of the first armature winding 2a are transferred to the first control circuit unit 4a and then inputted to the first CPU 10a. The first CPU 10a calculates the difference between a current command value, calculated by itself based on steering torque produced by the driver and the like, and a current detection value, calculated based on the respective potential differences across the shunt resistors 33Ua, 33Va, and 33Wa, and then provides a first driving command for making the difference zero to the first driving circuit 11a.

Based on the first driving command from the first CPU 10a, the first driving circuit 11a provides driving signals to the respective gate electrodes of the U-phase upper arm switching device 31Ua and the U-phase lower arm switching device 32Ua, the V-phase upper arm switching device 31Va and the V-phase lower arm switching device 32Va, and the W-phase upper arm switching device 31Wa and the W-phase lower arm switching device 32Wa in the first inverter circuit 3a so as to perform PWM (Pulse Width Modulation) control of the switching devices.

As described above, the first control unit 1a performs feedback control in such a way that the difference between the current command value and the current detection value becomes zero, so that a desired motor current is supplied to the first armature winding 2a and hence assist torque for assisting steering torque produced by the driver is produced in the electric motor 2.

Moreover, the first control unit 1a is provided with the first power-source relay 5a that performs on/off operation of power supply from the +B power source of the battery 9 to the first inverter circuit 3a. The first power-source relay 5a is formed of a power-source relaying switching devices Qa. When a driving signal from the first control circuit unit 4a performs on/off operation of the power-source relaying switching devices Qa, the first power-source relay 5a can perform on/off operation of a current to be supplied to the first armature winding 2a of the electric motor 2.

By being on/off-driven by driving signals from the first control circuit unit 4a, the U-phase motor relaying switching device 34Ua, the v-phase motor relaying switching device 34Va, and the W-phase motor relaying switching device 34Wa provided in the first inverter circuit 3a can separately perform on/off operation of currents to be supplied from the first inverter circuit 3a to the U-phase winding U1, the V-phase winding V1, and the W-phase winding W1, respectively, of the first armature winding 2a.

The first CPU 10a has an abnormality detection function of detecting an abnormality in the first driving circuit 11a, the first inverter circuit 3a, the first armature winding 2a or the like, in addition to performing calculation of a current value, which is a control amount for rotating the foregoing electric motor, based on inputted various kinds of information pieces, such as a steering torque detection value and a vehicle speed, from the sensors 8; when an abnormality in these units is detected, it is made possible to turn off the upper-arm switching device, the lower-arm switching device, and the motor relaying switching device of the phase in which the abnormality is detected, so that for example, only the current supply to a predetermined phase is cut off in accordance with the abnormality. Alternatively, it is also made possible that in the case where the foregoing abnormality is detected, the first power-source relay 5a is turned off in order to cut off the power source itself to be supplied to the first control unit 1a.

As described above, the first inverter circuit 3a is PWM-driven by a driving signal that is provided from the first driving circuit 11a, based on the first driving command from the first CPU 10a. Due to turn-on/off of the respective switching devices in the first inverter circuit 3a through the PWM driving, switching noise occurs. Accordingly, in order to suppress the switching noise from being emitted, the first filter circuit 6a including a filter capacitor Ca and a filter coil CLa is disposed at the input side of the first inverter circuit 3a.

Each of the marks "Δ" of the +B power source to be supplied to the first power-source relay 5a and the first filter circuit 6a and the ground terminal GND denotes a portion extended from the corresponding connection terminal indicated by the mark "o"; the details thereof will be described later.

Next, the second control unit 1b will be explained. The second control unit 1b is provided with a second control circuit unit 4b as a second control circuit equipped with a second CPU 10b, a second inverter circuit 3b that supplies an electric current to the second armature winding 2b of the electric motor 2, a second power-source relay 5b, and a second filter circuit 6b. The second control unit 1b is connected with the +B power source, which is the positive-polarity electrode of the battery 9 mounted in the vehicle, and with the ground terminal GND, which is the negative-polarity terminal of the battery 9. In the second control unit 1b, the second control circuit unit 4b is connected with a power source through an ignition switch 7; moreover, information pieces, for example, from the torque sensor that is mounted in the vicinity of the handwheel of the vehicle and detects steering torque, the speed sensor that detects the traveling speed of the vehicle, and the like are inputted from the sensors 8 to the second control circuit unit 4b.

The information pieces from the sensors 8 are transferred to the second CPU 10b by way of a second input circuit 12b provided in the second control circuit unit 4b. From those transferred information pieces, the second CPU 10b calculates a current value, which is a control amount for rotating the electric motor 2, and then outputs an output signal corresponding to the calculation value. The output signal from the second CPU 10b is transferred to a second driving circuit 11b forming a second output circuit and to the second inverter circuit 3b. The second driving circuit 11b receives a second command signal, which is the output signal from the second CPU 10b, and then outputs a second driving signal for driving after-mentioned switching devices in the second inverter circuit 3b. Because only a small current flows in the second driving circuit 11b, the second driving circuit 11b is mounted in the second control circuit unit 4b, in Embodiment 1; however, the second driving circuit 11b can be disposed also in the second inverter circuit 3b.

The second inverter circuit 3b is formed of a three-phase bridge circuit and is provided with a U-phase arm including a U-phase upper arm switching device 31Ub and a U-phase lower arm switching device 32Ub that are connected in series with each other, a V-phase arm including a V-phase upper arm switching device 31Vb and a V-phase lower arm switching device 32Vb that are connected in series with each other, and a W-phase arm including a W-phase upper arm switching device 31Wb and a W-phase lower arm switching device 32Wb that are connected in series with each other.

The series connection portion between the U-phase upper arm switching device 31Ub and the U-phase lower arm switching device 32Ub is connected with a U-phase winding U2 of the second armature winding 2b by way of a U-phase motor relaying switching device 34Ub. The series connection portion between the V-phase upper arm switching device 31Vb and the V-phase lower arm switching device 32Vb is connected with a V-phase winding V2 of the second armature winding 2b by way of a V-phase motor relaying switching device 34Vb. The series connection portion between the W-phase upper arm switching device 31Wb and the W-phase lower arm switching device 32Wb is connected with a W-phase winding W2 of the second armature winding 2b by way of a W-phase motor relaying switching device 34Wb.

A U-phase shunt resistor 33Ub for detecting a U-phase current is connected in series with the U-phase lower arm switching device 32Ub; a V-phase shunt resistor 33Vb for detecting a V-phase current is connected in series with the V-phase lower arm switching device 32Vb; a W-phase shunt resistor 33Wb for detecting a W-phase current is connected in series with the W-phase lower arm switching device 32Wb.

In the second inverter circuit 3b, a U-phase noise suppression capacitor 30Ub is connected in parallel with the U-phase arm including the U-phase upper arm switching device 31Ub and the U-phase lower arm switching device 32Ub. A V-phase noise suppression capacitor 30Vb is connected in parallel with the V-phase arm including the V-phase upper arm switching device 31Vb and the V-phase lower arm switching device 32Vb. A K-phase noise suppression capacitor 30Wb is connected in parallel with the W-phase arm including the W-phase upper arm switching device 31Wb and the W-phase lower arm switching device 32Wb.

Respective potential differences across the U-phase shunt resistor 33Ub, the V-phase shunt resistor 33Vb, and W-phase shunt resistor 33Wb and respective voltages at the winding terminals of the second armature winding 2b are transferred to the second control circuit unit 4b and are inputted to the second CPU 10b. The second CPU 10b calculates the difference between a current command value, calculated by itself based on steering torque produced by the driver and the like, and a current detection value, calculated based on the respective potential differences across the shunt resistors 33Ub, 33Vb, and 33Wb, and then provides a second driving command for making the difference zero to the second driving circuit 11b.

Based on the second driving command from the second CPU 10b, the second driving circuit 11b provides driving signals to the respective gate electrodes of the U-phase upper arm switching device 31Ub and the U-phase lower arm switching device 32Ub, the V-phase upper arm switching device 31Vb and the V-phase lower arm switching device 32Vb, and the W-phase upper arm switching device 31Wb and the W-phase lower arm switching device 32Wb in the second inverter circuit 3b so as to perform PWM control of the switching devices.

As described above, as is the case with the foregoing first control unit 1a, the second control unit 1b performs feedback control in such a way that the difference between the current command value and the current detection value becomes zero, so that a desired motor current is supplied to the second armature winding 2b and hence assist torque for assisting steering torque produced by the driver is produced in the electric motor 2.

Moreover, the second control unit 1b is provided with the second power-source relay 5b that performs on/off operation of power supply from the +B power source of the battery 9 to the second inverter circuit 3b. The second power-source relay 5b is formed of a power-source relaying switching devices Qb. When a driving signal from the second control circuit unit 4b performs on/off operation of the power-source relaying switching devices Qb, the second power-source relay 5b can perform on/off operation of a current to be supplied to the second armature winding 2b the electric motor 2.

By being on/off-driven by driving signals from the second control circuit unit 4b, the U-phase motor relaying switching device 34Ub, the V-phase motor relaying switching device 34Vb, and the W-phase motor relaying switching device 34Wb provided in the second inverter circuit 3b can separately perform on/off operation of currents to be supplied from the second inverter circuit 3b to the U-phase winding U2, the V-phase winding V2, and the W-phase winding W2, respectively, of the second armature winding 2b.

The second CPU 10b has an abnormality detection function of detecting an abnormality in the second driving circuit 11b, the second inverter circuit 3b, the second armature winding 2b or the like, in addition to performing calculation of a current value, which is a control amount for rotating the foregoing electric motor, based on inputted various kinds of information pieces, such as a steering torque detection value and a vehicle speed, from the sensors 8; when an abnormality in these units is detected, it is made possible to turn off the upper-arm switching device, the lower-arm switching device, and the motor relaying switching device of the phase in which the abnormality is detected, so that for example, only the current supply to a predetermined phase is cut off in accordance with the abnormality. Alternatively, it is also made possible that in the case where the foregoing abnormality is detected, the second power-source relay 5b is turned off in order to cut off the power source itself to be supplied to the second control unit 1b.

As described above, the second inverter circuit 3b is PWM-driven by a driving signal that is provided from the second driving circuit 11b, based on the second driving command from the second CPU 10b. Due to turn-on/off of the respective switching devices in the second inverter circuit 3b through the PWM driving, switching noise occurs. Accordingly, in order to suppress the switching noise from being emitted, the second filter circuit 6b including a filter capacitor Cb and a filter coil CLb is disposed at the input side of the second inverter circuit 3b.

Each of the marks "Δ" of the +B power source to be supplied to the second power-source relay 5b and the second filter circuit 6b and the ground terminal GND denotes a portion extended from the corresponding connection terminal indicated by the mark "o"; the details thereof will be described later.

The electric motor 2 is formed of a brushless electric motor in which as described above, the two sets of armature windings including the three-phase first armature winding 2a and the three-phase second armature winding 2b are each delta-connected. The brushless electric motor is equipped with the first rotation sensor 17a and the second rotation sensor 17b for detecting the rotation position of the rotor. As described above, in order to secure the redundancy, two sets of rotation sensors, which are substantially in the same configuration, are provided. The information on the rotation position of the rotor, detected by the first rotation sensor 17a, is transferred to the first control circuit unit 4a and then is inputted to the first input circuit 12a. The information on the rotation position of the rotor, detected by the second rotation sensor 17b, is transferred to the second control circuit unit 4b and then is inputted to the second input circuit 12b.

The electric motor 2 may be not a three-phase delta-connection brushless motor but a three-phase star connection brushless motor or a double-pole two-pair brush motor.

As is the case with a conventional apparatus, the winding specification of the armature winding may be either distributed winding or concentrated winding. Furthermore, the electric motor 2 may be a so-called tandem electric motor having two stators. In this case, it may be allowed that only one set of armature winding is provided or that two sets of armature windings are provided and driving is performed by collaboration of these armature windings; what matters is that any configuration is allowed as long as a desired motor rotation speed is achieved and desired torque can be outputted.

A notification means 15 is configured, for example, in such a way as to be able to light a lamp; in the case where the first CPU 10a detects the foregoing abnormality, an action such as lighting a lamp is taken based on an alarm signal to be outputted from the first CPU 10a by way of the first output circuit 16a, so that the abnormality is notified to the driver; alternatively, in the case where the second CPU 10b detects the foregoing abnormality, an action such as lighting a lamp is taken based on an alarm signal to be outputted from the second CPU 10b by way of the second output circuit 16b, so that the abnormality is notified to the driver.

As described above, each of the first control unit 1a and the second control unit 1b independently utilizes input information and the calculation value for a control amount and is capable of independently driving the electric motor 2. The first control unit 1a and the second control unit 1b are connected with each other through a communication line 14 so that data and information of the opposite party can be transmitted and received. The communication line 14 connects the first CPU 10a with the second CPU 10b, so that the first CPU 10a can comprehend the condition of the second CPU 10b, and vice versa. For example, when the first CPU 10a detects the foregoing abnormality and hence turns off the foregoing predetermined switching device, the contents of abnormality detection, abnormal components, the contents of motor driving, and the like can be transferred to the second CPU 10b. When an abnormality occurs in any one of the CPUs themselves, the periodic predetermined-format communication signal can be neither transmitted nor received; thus, it is also made possible that one of the CPUs detects the fact that an abnormality has occurred in the other one of the CPUs.

Figure 2:
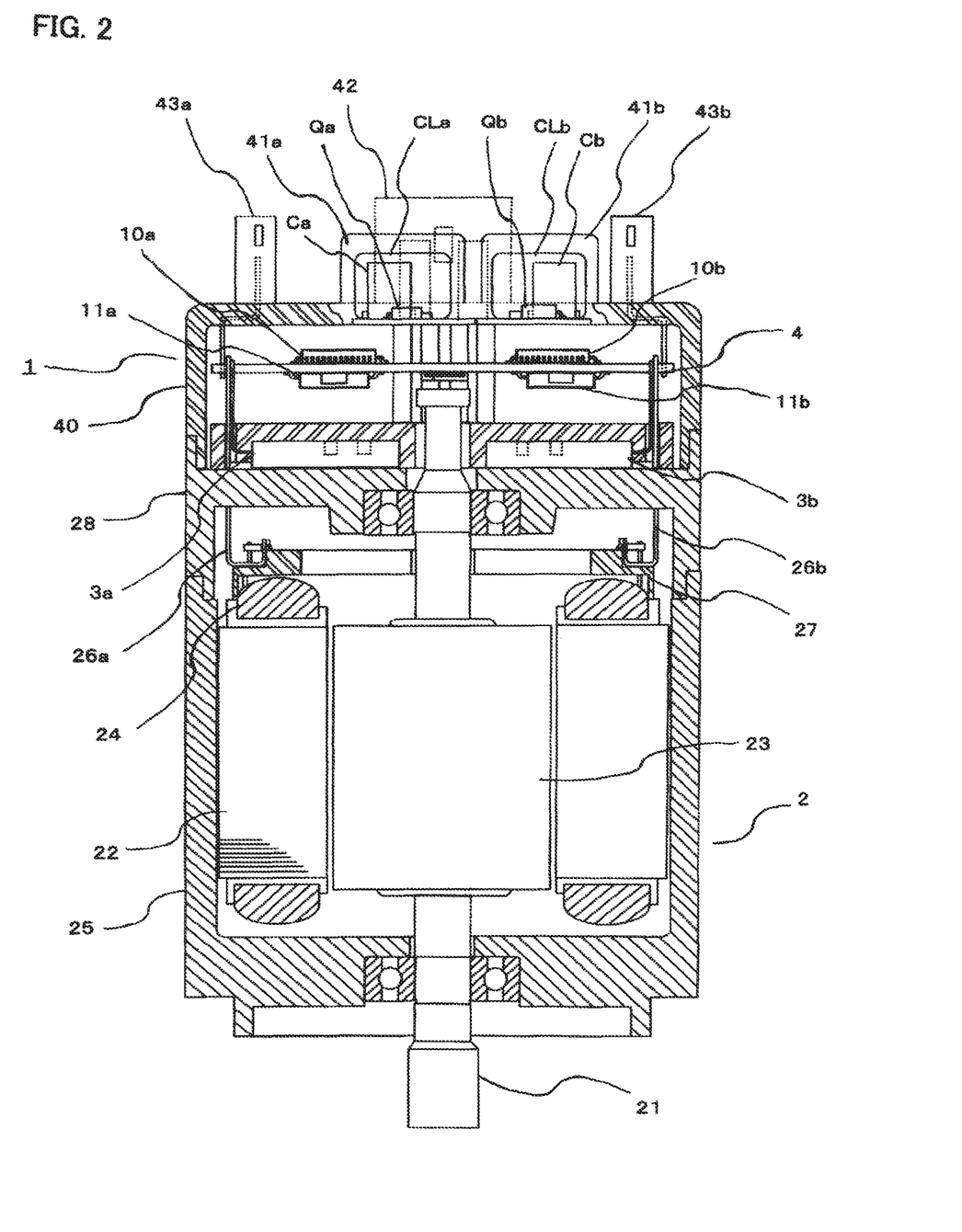
FIG. 2 is a cross-sectional view of the electric power steering apparatus according to Embodiment 1 of the present invention.

Next, the structure of the electric power steering apparatus according to Embodiment 1 of the present invention will be explained. FIG. 2 is a cross-sectional view of the electric power steering apparatus according to Embodiment 1 of the present invention. In FIG. 2, the lower side of the drawing is the electric motor 2; the control unit 1 including the foregoing first and second control units is disposed at the upper side, with respect to the electric motor 2, of the drawing. The electric motor 2 and the control unit 1 are integrated with each other in the axel direction in such a way as to be arranged coaxially on an electric-motor output axle 21, through the intermediary of an after-mentioned frame 28.

The electric motor 2 has an electric motor case 25 formed in the shape of a substantially cylindrical tube. With regard to the electric motor case 25, the lower most portion thereof in the drawing is covered with a wall portion that extends in a direction perpendicular to the axle direction, and the uppermost portion thereof in the drawing is opened. The foregoing wall portion of the electric motor case 25 is coupled with a case (unillustrated) of a deceleration mechanism unit. The electric-motor output axle 21 is pivotably supported by a bearing member provided in the wall portion of the electric motor case 25, penetrates the electric motor case 25, and is coupled with an unillustrated input axle of the deceleration mechanism unit.

In the electric motor case 25, there are provided a rotor 23 having two or more pairs of permanent-magnet magnetic-field poles arranged around the outer circumferential surface of the output axle 21 and a stator 22 whose inner circumferential surface faces the outer circumferential surface of the rotor 23 through a gap. The rotor 23 is fixed on the outer circumferential surface of the electric-motor output axle 21. An armature winding 24 is inserted into a slot provided in the stator 22 and includes the foregoing three-phase first armature winding 2a (unillustrated) and three-phase second armature winding 2b (unillustrated).

A ring-shaped connection ring 27 is disposed in the immediate vicinity of one of the axle-direction end portions of the armature winding 24 and is fixed to the stator 22. As described above, each of the first armature winding and the second armature winding included in the armature winding 24 has the U-phase winding, the V-phase winding, and the W-phase winding. The U-phase winding, the V-phase winding, and the W-phase winding of the first armature winding in the armature winding 24 are delta-connected with one another; each of three first winding end portions 26a connected with the respective phase windings is pulled out from the connection ring 27 in the axle direction of the electric motor 2 and extends into the control unit 1. Similarly, the U-phase winding, the V-phase winding, and the W-phase winding of the second armature winding in the armature winding 24 are delta-connected with one another through the intermediary of the connection ring 27; each of three second winding end portions 26b connected with the respective phase windings is pulled out from the connection ring 27 in the axle direction of the electric motor 2 and extends into the control unit 2.

The frame 28 made of metal is coupled with the opening portion of the electric motor case 25 so as to cover the opening portion of the electric motor case 25; concurrently, the frame 28 pivotably supports the electric-motor output axle 21 through the intermediary of a bearing member. The electric-motor output axle 21 penetrates the frame 28 in the axle direction and extends into a housing 40 that covers the control unit 1. The frame 28 has a through-hole (unillustrated), through which the first winding end portion 26a passes, and a through-hole (unillustrated), through which the second winding end portion 26b passes, arranged at respective positions that face each other with respect to the center axis and are in the vicinity of the peripheral portion; the first winding portion 26a and the second winding end portion 26b are made to penetrate these respective through-holes.

The housing 40 covers the control unit 1 and incorporates the control board 4 forming the first control circuit unit 4a and the second control circuit unit 4b represented in FIG. 1, the first inverter circuit 3a, the second inverter circuit 3b, and the like. At the upper portion, in the drawing, of the housing 40, i.e., at the axle-direction endface thereof, there are provided a first filter room 41a, which is convex and protrudes in the axle direction, and a second filter room 41b, which is convex and protrudes in the axle direction. The first filter room 41a incorporates the power-source relaying switching device Qa forming the first power-source relay 5a and the filter capacitor Ca and the filter coil CLa forming the first filter circuit 6a. The second filter room 41b incorporates the power-source relaying switching device Qb forming the second power-source relay 5b and the filter capacitor Cb and the filter coil CLb forming the second filter circuit 6b.

A power-source connector 42 is disposed at a position that is in the vicinity of the first filter room 41*a* and the second filter room 41*b* on the axle-direction endface of the housing 40 and is the peripheral portion of the housing 40; furthermore, the first signal connector 43*a* and the second signal connector 43*b* for the sensors 8 are arranged at respective positions that are apart from the power-source connector 42. The housing 40, the first filter room 41*a*, the second filter room 41*b*, the power-source connector 42, the first signal connector 43*a*, and the second signal connector 43*b* are each formed of resin; all or part of these members are integrated with one another.

The control board 4 is equipped with circuits components included in the first control circuit unit 4*a* and the second control circuit unit 4*b*. In other words, the first CPU 10*a* and the second CPU 10*b* are mounted on the upper side, in the drawing, of the control board 4, i.e., on the anti-motor-side surface thereof; the first driving circuit 11*a*, the second driving circuit 11*b*, and the like are mounted on the lower side, in the drawing, of the control board 4, i.e., on the motor-side surface thereof.

The first inverter circuit 3*a* is formed as a first power module in which there are integrally molded, with resin, the U-phase upper arm switching device 31Ua, the V-phase upper arm switching device 31Va, and the W-phase upper arm switching device 31Wa, the U-phase lower arm switching device 32Ua, the V-phase lower arm switching device 32Va, and the W-phase lower arm switching device 32Wa, the U-phase motor relay switching device 34Ua, the V-phase motor relay switching device 34Va, and the W-phase motor relay switching device 34Wa, the U-phase noise suppression capacitor 30Ua, the V-phase noise suppression capacitor 30Va, and the W-phase noise suppression capacitor 30Wa, and the U-phase shunt resistor 33Ua, the V-phase shunt resistor 33Va, and the W-phase shunt resistor 33Wa.

The second inverter circuit 3*b* is formed as a second power module in which there are integrally molded, with resin, the U-phase upper arm switching device 31Ub, the V-phase upper arm switching device 31Vb, and the W-phase upper arm switching device 31Wb, the U-phase lower arm switching device 32Ub, the V-phase lower arm switching device 32Vb, and the W-phase lower arm switching device 32Wb, the U-phase motor relay switching device 34Ub, the V-phase motor relay switching device 34Vb, and the W-phase motor relay switching device 34Wb, the U-phase noise suppression capacitor 30Ub, the V-phase noise suppression capacitor 30Vb, and the W-phase noise suppression capacitor 30Wb, and the U-phase shunt resistor 33Ub, the V-phase shunt resistor 33Vb, and the W-phase shunt resistor 33Wb.

When driven, each of the first inverter circuit 3*a* as the first power module and the second inverter circuit 3*b* as the second power module causes heat, generation; therefore, each of them is made to abut on the surface, at the control unit side, of the frame 28 so that the heat can be transferred to the metal frame 28. In other words, the frame 28 has a role also as a heat sink. The first winding end portions 26*a* is connected with the output terminal of the first inverter circuit 3*a* as the first power module. The second winding end portions 26*b* is connected with the output terminal of the second inverter circuit 3*b* as the second power module.

Figure 3:
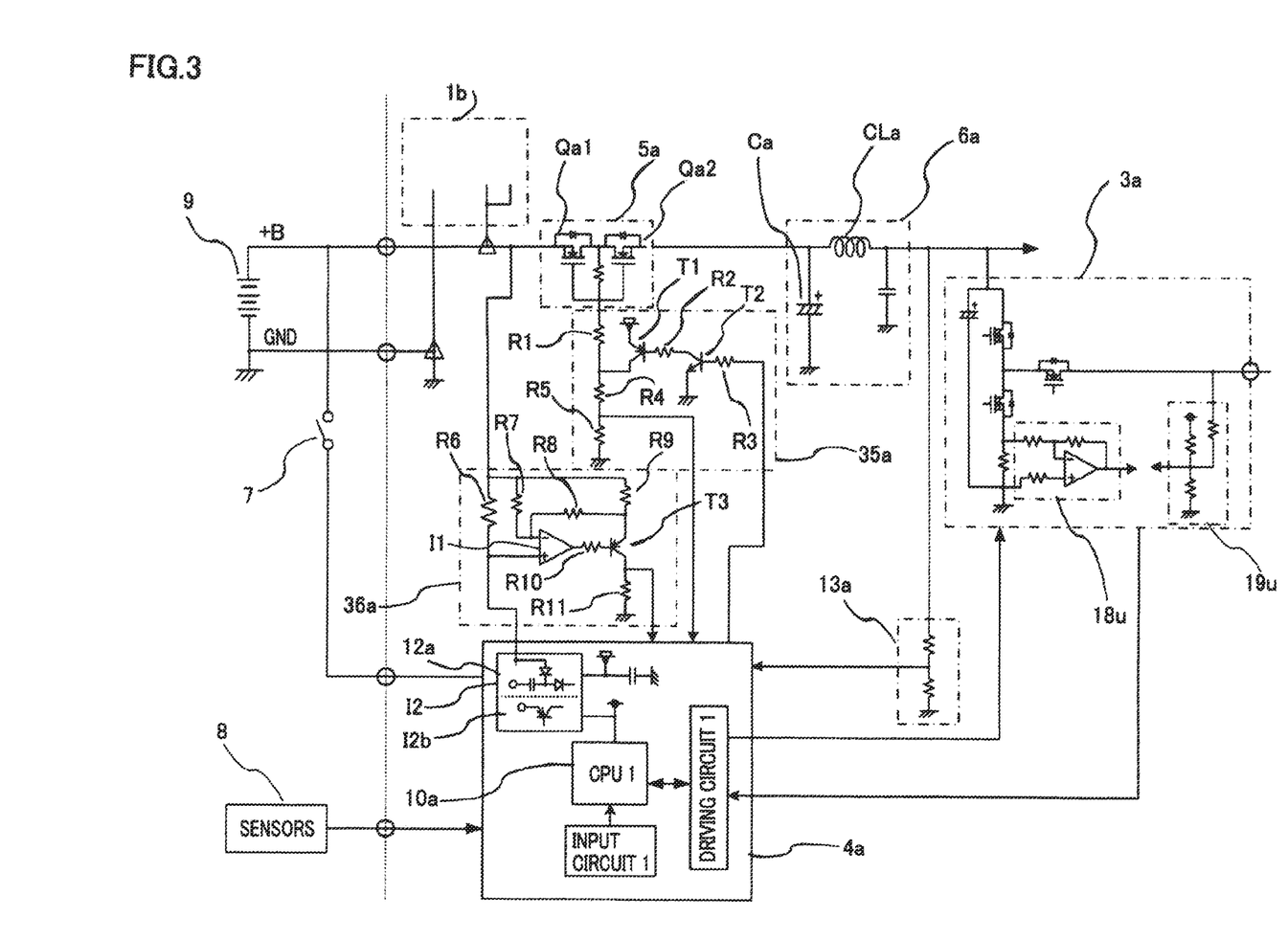
FIG. 3 is a detailed circuit diagram of part of the electric power steering apparatus according to Embodiment 1 of the present invention.

Next, the configurations of peripheral circuits such as the power source relay and the filter circuit in the control unit will be explained in detail. In the following explanation, the first control unit 1*a* will be explained; however, the second control unit 1*b* is configured in the same manner. FIG. 3 is a detailed circuit diagram of part of the electric power steering apparatus according to Embodiment 1 of the present invention; FIG. 3 represents in detail the circuit configuration of part of the first control unit 1*a* represented in FIG. 1. In FIG. 3, the +B power source connected with the positive-polarity electrode of the battery 9 is connected with the electric power steering apparatus by way of a connection terminal indicated by the mark "o" in the drawing; the +B power source branches into the first control unit 1*a* and the second control unit 1*b* at a branch point indicated by the mark "Δ".

Furthermore, in the first control unit 1*a*, the +B power source branches into a first detection circuit 36*a* and the first power-source relay 5*a* at a second branch point following the branch point indicated by the mark "Δ". As represented in FIG. 3, the first power-source relay 5*a* includes power-source relaying switching devices Qa1 and Qa2 that are connected in series with each other and are connected in parallel with respective diodes whose directions are opposite to each other. The power-source relaying switching device Qa in the first power-source relay 5*a* represented in FIG. 1 is described as the one that includes the power-source relaying switching devices Qa1 and Qa2 represented in FIG. 3.

Because as described above, the power-source relaying switching devices Qa1 and Qa2 in the first power-source relay 5*a* are connected in series with each other and are connected in parallel with the respective diodes whose directions are opposite to each other, the direction in which a current flows is determined; thus, for example, even when the positive-polarity electrode and the negative-polarity electrode of the battery 9 are connected the other way around, no current flows. Moreover, as described above, in the case where any abnormality occurs, power supply can be cut off based on a command from the first CPU 10*a*.

In the electric power steering apparatus according to Embodiment 1 of the present invention, in order to drive the power-source relaying switching devices Qa1 and Qa2 in the first power-source relay 5*a*, a power-source relay driving circuit 35*a* formed of resistors R1, R2, and R3, and transistors T1 and T2 is provided. In the power-source relay driving circuit 35*a*, the emitter of the transistor T1 is connected with a power source, indicated by the mark "∇", in the first control unit 1*a*; the collector thereof is connected with the series connection point between the resistor R1 and a resistor R4.

One of the terminals of the resistor R1 is connected with the respective gate electrodes of the power-source relaying switching devices Qa1 and Qa2. The base of the transistor T1 is connected with the collector of the transistor T2 via the resistor R2. The emitter of the transistor T2 is connected with the ground level, and the base electrode is connected with the first control circuit unit 4*a* via the resistor R3. The voltage across a resistor R5 is inputted to the first control circuit unit 4*a*. The transistor T2 is on/off-controlled by a driving signal from the first control circuit unit 4*a*, based on a command from the first CPU 10*a*; the transistor T1 is on/off-controlled based on on/off of the transistor T2.

The power source ∇ with which the emitter of the transistor T1 is connected is a power source having an electric potential higher than the +B power source connected with the positive-polarity electrode of the battery 9; thus, it is made possible to turn on the power-source relaying switching devices Qa1 and Qa2. The resistors R4 and R5 are each a monitoring voltage dividing resistor and are configured in such a way that the first control circuit unit 4a can detect the respective ON states of the transistors T1 and T2.

The first filter circuit 6a including the filter capacitor Ca, the filter coil CLa, and the like is connected with the downstream side of the first power-source relay 5a; the first inverter circuit 3a is connected with the downstream side of the first filter circuit 6a. The electric potential at a connection point as the intermediate point between the first filter circuit 6a and the first inverter circuit 3a is detected by a second detection circuit 13a and is inputted to the first control circuit unit 4a; the first control circuit unit 4a monitors the voltage. In the case where even though the first power-source relay 5a is turned on, the second detection circuit 13a cannot detect a voltage corresponding to the output voltage of the battery 9, the first CPU 10a can determine that there exists probability that a short-to-ground failure might have occurred at the upstream side of the first inverter circuit 3a in the first control unit 1a, based on the voltage monitored by the resistors R4 and R5 and the voltage from the second detection circuit 13a.

A third detection circuit 18u detects a current flowing in the U-phase lower arm in the first inverter circuit 3a and then inputs the current to the first control circuit unit 4a; a fourth detection circuit 19u detects the terminal voltage of the U-phase winding U1 of the first armature winding 2a and then inputs the terminal voltage to the first control circuit unit 4a. Each of respective currents flowing in the V-phase lower arm and the W-phase lower arm in the first inverter circuit 3a is detected by a detection circuit similar to the third detection circuit 18u and is inputted to the first control circuit unit 4a. Each of the respective terminal voltages of the V-phase winding V1 and the W-phase winding W1 of the first armature winding 2a is detected by a detection circuit similar to the fourth detection circuit and is inputted to the first control circuit unit 4a. The first control circuit unit 4a monitors the inputted currents in the lower arms of the respective phases and the inputted voltages of the respective winding terminals of the armature winding 2a of the electric motor 2 so as to detect a short-circuit failure or a short-to-ground failure in the switching devices in the first inverter circuit 3a and the armature winding 2a of the electric motor 2, and the like; it is made possible that the first control circuit unit 4a cuts off the first power-source relay 5a depending on the contents of the failure.

It is desirable that the current detection circuits of the respective phases such as the foregoing power-source relay driving circuit 35a, the second detection circuit 13a, the third detection circuit 18u, and the like and the winding-terminal-voltage detection circuits such as the fourth detection circuit 19u and the like are provided in all of the respective two sets of the first control unit 1a and the second control unit 1b of the three phases.

Each of the voltages or the currents that are monitored by the foregoing detection circuits is transferred to the first CPU 10a in the first control circuit unit 4a. In accordance with a control command of its own, the first CPU 10a comprehends the contents of the monitored voltage or current so as to determine whether or not an abnormality exists. In other words, in the case where even though a predetermined current flows in the electric motor 2, the third detection circuit 18u cannot detect the voltage or a voltage other than the one corresponding to the predetermined current is generated, the first CPU 10a can determine that an abnormality exists. In the case where even though the electric motor is driven, no voltage is generated or in the case where when the electric motor 2 is not driven, a voltage is generated, the first CPU 10a can determine that an abnormality exists, because the detection circuits, such as the fourth detection circuit 19u and the like, of the respective phases monitor the terminal voltages of the respective phases of the electric motor 2. In the case of these abnormalities, the first CPU 10a outputs a control command to the first driving circuit 11a so as to cut off the first power-source relay 5a. Moreover, it is also made possible to stop a power source circuit I2.

A power source for turning on the first power-source relay 5a in which a relatively small current flows and a control command circuit therefor are connected with another branch of the line of the +B power source of the battery 9. Accordingly, a failure may occur also in this circuit network; thus, in the case where the failure causes an excessive current to flow, the power source relay needs to be cut off. Accordingly, the first detection circuit 36a is provided. As represented in FIG. 3, the first detection circuit 36a includes resistors R6, R7, and R9, each one end of which is connected with the branch point V of the +B power source, a transistor T3 whose emitter is connected with the other end of the resistor R9 and whose collector is connected with the ground level via a resistor R11, a resistor R8 whose one end is connected with the other end of the resistor R9, and an amplifier I1, one of the input terminals of which is connected with the other ends of the resistors R7 and R8, the other one of the input terminals of which is connected with the other end of the resistor R6, and the output terminal of which is connected with the base of the transistor T3 via a resistor R10.

The basic operation of the first detection circuit 36a is to amplify a potential difference caused by an current flow in the resistor R6, by use of the amplifier I1; the first CPU 10a monitors whether or not the value obtained through the amplification by the first detection circuit 36a is within a predetermined range.

A power source circuit I2 having a circuit 12a including a capacitor and a diode and a circuit 12b including a transistor is provided in the first control circuit unit 4a; the input terminal of the power source circuit I2 is connected with the other one or the input terminals of the amplifier I1. The output terminal of the power source circuit I2 is connected with the first CPU 10a.

As described above, the first CPU 10a monitors whether or not the value obtained through the amplification by the first detection circuit 36a is within a predetermined range; setting of the predetermined range is determined by a current value to be consumed by the first detection circuit 36a, the power source circuit I2, and the like. When the first detection circuit 36a detects the fact that an excessive current flows in the resistor R6, it is suggested that an abnormality has occurred in the first detection circuit 36a, the power source circuit I2, or the like; therefore, in addition to outputting in such a way as to cut off the first power-source relay 5a, the first CPU 10a, for example, stops the power source circuit I2 so as to prevent the excessive current.

The power source circuit I2 generates a power source of a high voltage indicated by the mark "V" and a power source, which has a voltage lower than the battery voltage, for the circuits to be directly driven by the battery. For example, the power source circuit I2 is formed of a charge pump circuit and has the circuit 12a including a capacitor and a diode represented in FIG. 3 and the circuit 12b including a transistor having a function as a constant voltage power source to be utilized in the first CPU 10a; therefore, even when the ignition switch 7 is not turned on, the first CPU 10a can perform its function.

As described above, two or more circuit networks are formed in the vicinity of the power source relay; there are provided two sets of the circuit networks. When the redundancy is taken into consideration, it is required that after connection with the apparatus, the respective circuits are each formed of a double system and that when being abnormal, one of the double systems is cut off so that no effect is provided to the other one thereof. Therefore, at first, the power source relay is connected; then, the filter circuit and the inverter circuit are connected. For example, in the case where a short-circuit failure occurs in the capacitor in the filter circuit, the failure point is situated at the downstream side of the power source relay; thus, cutting off of the power source relay prevents any effect from being provided to the normal system. Each of the second driving circuit and the first detection circuit 36*a* is connected by a narrow strip conductor that can be cut off by an excessive current when as in the case of a short-to-ground failure, the excessive current flows in the second driving circuit or the first detection circuit 36*a*, so that it is also made possible to prevent a large current from flowing.

Embodiment 2

Figure 4:
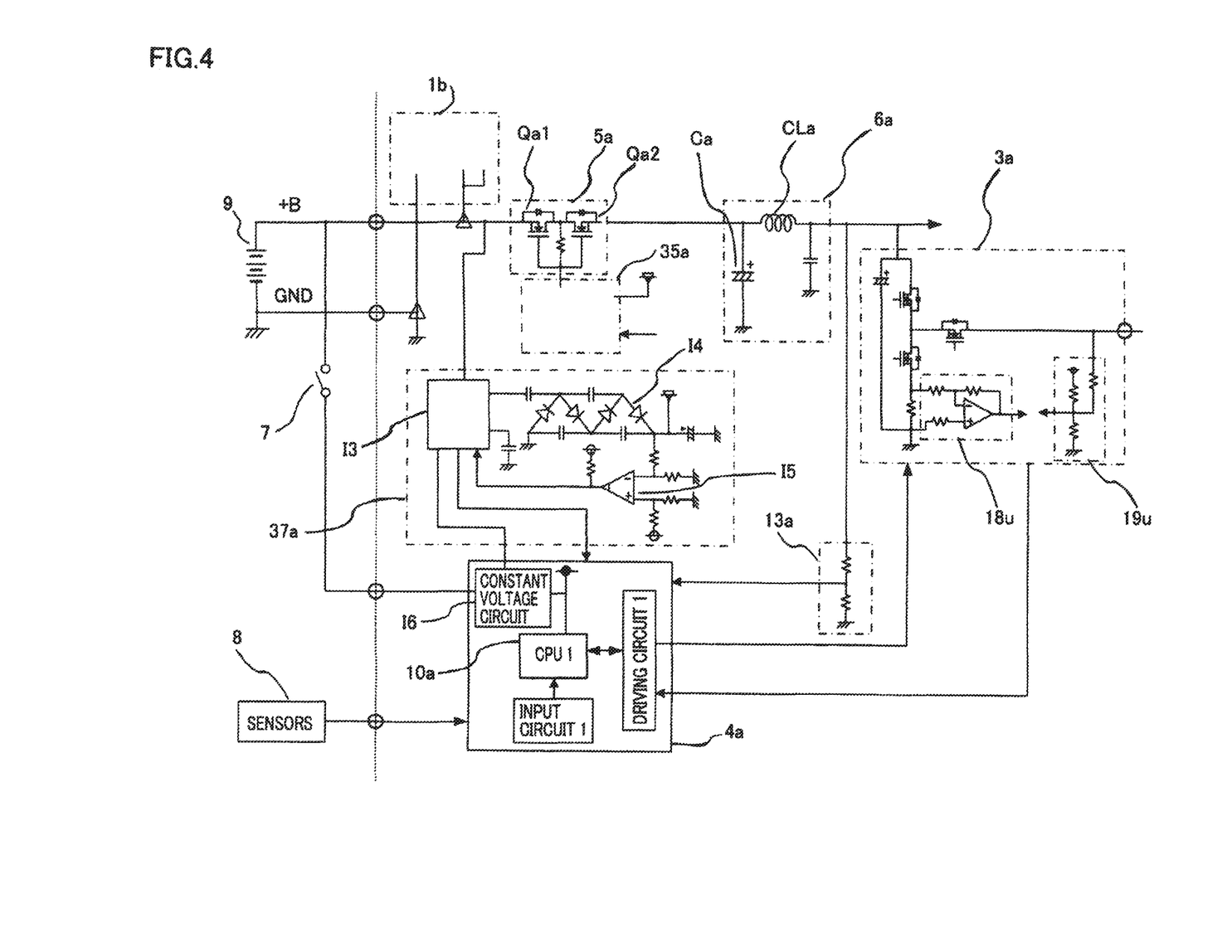
FIG. 4 is a detailed circuit diagram of part of an electric power steering apparatus according to Embodiment 2 of the present invention.

Next, an electric power steering apparatus according to Embodiment 2 of the present invention will be explained. FIG. 4 is a detailed circuit diagram of part of an electric power steering apparatus according to Embodiment 2 of the present invention and is a circuit network corresponding to FIG. 3 of Embodiment 1; reference characters the same as those in FIG. 3 denote the same or similar portions. The other configurations are the same as those of the electric power steering apparatus according to Embodiment 1.

In FIG. 4, a first detection circuit 37*a* as a voltage boosting circuit is inserted instead of the first detection circuit 36*a* in FIG. 3. The first detection circuit 37*a* is provided with an IC circuit I3, a circuit I4 including diodes and capacitors, and a circuit I5 having an amplifier. The main function of the first detection circuit 37*a* as the voltage boosting circuit represented in FIG. 4 is a function as a voltage-boosted power source generator; for example, as represented by the circuit I4, the voltage boosting function is configured as a Cockcroft-Walton ladder and creates a voltage-boosted power source indicated by the mark "V" in FIG. 4. In other words, this function corresponds to the power source circuit I2 in FIG. 3 of Embodiment 1. In contrast, the first control circuit unit 4*a* includes the constant voltage circuit I6 utilized, for example, for the first CPU 10*a*. Because it is utilized for driving the first power-source relay 5*a* and the like, the voltage-boosted power source that is configured of the first detection circuit 37*a* and is indicated by the mark "V" is created from the line of the +B power source. This line of the +B power source is one of the lines obtained when the +B power source line branches into four lines in the immediate vicinity of the terminal of the power-source connector; this line is inputted directly to the IC I3.

The IC I5 is a voltage monitoring circuit for the voltage-boosted power source marked by "V"; when the boosted voltage becomes higher than a predetermined value, the IC I5 transmits a signal for prohibiting voltage boosting to the IC I3. The IC I3 is an oscillation unit for the voltage boosting circuit; when the voltage-boosted power source further includes an excessive-current detection function and a high-temperature cutoff function, it is made possible to have a function that works to stop voltage boosting when an abnormality occurs. An abnormality in the first detection circuit 37*a* is transferred also to the first CPU 10*a*; the first CPU 10*a* can comprehend not only whether or not the abnormality exists but also the contents of the abnormality; thus, the first CPU 10*a* can flexibly cope with the abnormality by completely stopping the driving of the electric motor or by partially driving the electric motor, depending on the contents of the abnormality.

As described above, in the electric power steering apparatus according to Embodiment 2 of the present invention, the first detection circuit 37*a* is inserted into the small-current line of the +B power source, and it is made possible that an abnormality in this circuit, especially an excessive voltage or an excessive current is detected so that the function of this circuit is stopped. Each of the sets has at least two branches from the terminal of the power-source connector, i.e., totally four branches are provided, and, as is the case with a large-current line, even a small-current line has an abnormality detection means in a circuit inserted into the line; for example, when an excessive current flows, the function thereof is stopped or the line itself is cut off, so that operation is performed in such a way that this abnormality does not provide any effect to the other lines.

In some times, as the original power source for the constant voltage circuit I6, not only ignition switch 7 but also the +B power source is utilized; thus, the constant voltage circuit I6 is also made to include a function of detecting an excessive current or a function of detecting the fact that the constant voltage has exceeded a predetermined range, so that the constant voltage circuit I6 can stop its own circuit function when an abnormality occurs. Because the constant voltage circuit I6 supplies a power source itself to the first CPU 10*a*, stoppage of driving via the first CPU 10*a* may not be implemented; thus, it is desirable that the stoppage is performed by the circuit network itself.

As described above, with regard to the circuits connected with or inserted into the power source line, an abnormality, especially an excessive current is detected at an uppermost-stream position, and then the function at a position where the cause of the abnormality may exists is stopped or the relay is cut off, so that no effect is provided to the other circuits and the other set and hence the redundancy can be secured.

The present invention is not limited to the electric power steering apparatus according to any one of foregoing Embodiments 1 and 2; in the scope within the spirits of the present invention, the configurations of Embodiments 1 and 2 can appropriately be combined with each other, can partially be modified, or can partially be omitted.

INDUSTRIAL APPLICABILITY

An electric power steering apparatus according to the present invention can be applied to the field of an electric power steering apparatus in which an electric motor assists steering torque produced by a vehicle driver or to the field of a vehicle such as an automobile that is equipped with the electric power steering apparatus.

DESCRIPTION OF REFERENCE NUMERALS

1: control unit
1*a*: 1st control unit
1*b*: 2nd control unit
2: electric motor
24: armature winding
2*a*: 1st armature winding
2*b*: 2nd armature winding
10*a*: 1st CPU 10b: 2nd CPU
3a: 1st inverter circuit
3b: 2nd inverter circuit
4a: 1st control circuit unit
4b: 2nd control circuit unit
5a: 1st power-source relay
5b: 2nd power-source relay
6a: 1st filter circuit
6b: 2nd filter circuit
7: ignition switch
8: sensors
9: battery
12a: 1st input circuit
12b: 2nd input circuit
11a: 1st driving circuit
11b: 2nd driving circuit
30Ua, 30Ub: U-phase noise suppression capacitor
30Va, 30Vb: V-phase noise suppression capacitor
30Wa, 30Wb: W-phase noise suppression capacitor
31Ua, 31Db: U-phase upper arm switching device
31Va, 31Vb: V-phase upper arm switching device
31Wa, 31Wb: W-phase upper arm switching device
32Ua, 32Ub: U-phase lower arm switching device
32Va, 32Vb: V-phase lower arm switching device
32Wa, 32Wb: W-phase lower arm switching device
33Ua, 33Ub: U-phase shunt resistor
33Va, 33Vb: V-phase shunt resistor
33Wa, 33Wb: W-phase shunt resistor
34Ua, 34Ub: U-phase motor relay switching device
34Va, 34Vb: V-phase motor relay switching device
34Wa, 34Wb: W-phase motor relay switching device
5a: 1st power-source relay
5b: 2nd power-source relay
Qa, Qa1, Qa2, Qb: power-source relaying switching device
Ca, Cb: filter capacitor
CLa, CLb: filter coil
17a: 1st rotation sensor
17b: 2nd rotation sensor
15: notification means
16a: 1st output circuit
16b: 2nd output circuit
21: electric-motor output axle
25: electric motor case
26a: 1st winding end portion
26b: 2nd winding end portion
27: connection ring
28: frame
11a: 1st filter room
41b: 2nd filter room
42: power-source connector
43a: 1st signal connector
43b: 2nd signal connector
35a: power-source relay driving circuit
36a, 37a: 1st detection circuit
13a: 2nd detection circuit
18u: 3rd detection circuit
19u: 4th detection circuit

The invention claimed is:

1. An electric power steering apparatus comprising:
an electric motor that produces assist torque, based on steering torque produced by a driver of a vehicle;
a controller that controls the electric motor; and
a power-source connector that is connected with a battery mounted in the vehicle and supplies respective power sources to the controller and the electric motor,
wherein the electric motor is provided with two sets of armature windings including a first armature winding and a second armature winding that are formed in substantially the same manner,
wherein the controller is formed of two sets of controllers that are formed in substantially the same manner and that include a first controller formed in such a way as to be capable of independently controlling the first armature winding and a second controller formed in such a way as to be capable of independently controlling the second armature winding,
wherein each of the first controller and the second controller has
a power source relay formed in such a way as to be capable of turning on/off a power source,
a filter circuit connected with the power source relay,
an input circuit to which information from a sensor is inputted,
a driving circuit that generates a driving signal for driving the electric motor,
an inverter circuit that is controlled by the driving signal, and
a control circuit provided with a CPU that outputs to the driving circuit a command signal for controlling the electric motor based on the information inputted to the input circuit,
wherein the power-source connector is formed of a single connector,
wherein out of terminals of the power-source connector, a power source system to be connected at least with the positive-polarity side of the battery branches into two lines in the immediate vicinity of the terminals; one of the branch lines is connected with the first controller and the other one of the branch lines is connected with the second controller,
wherein each of the two branch lines further re-branches into two lines,
wherein the power source relay, the filter circuit, and the inverter circuit are connected with one of the re-branch lines, and
wherein the control circuit is connected with the other one of the re-branch lines by way of a first detection circuit that detects an abnormality in a circuit connected with the control circuit.

2. The electric power steering apparatus according to claim 1, wherein in the case where a current flowing in the other one of the re-branch lines exceeds a predetermined range, which is preliminarily set, the first detection circuit in the controller stops a function of the control circuit connected with the other one of the re-branch lines and notifies the CPU of the stoppage.

3. The electric power steering apparatus according to claim 2, further including a second detection circuit that detects a current flowing in the one of the re-branch lines, wherein in the case where the current detected by the second detection circuit is larger than a predetermined value, which is preliminarily set, the power source relay is made to operate so as to cut off the one of the re-branch lines.

4. The electric power steering apparatus according to claim 3, further including a third detection circuit that detects a current flowing at the downstream side of the filter circuit in the one of the re-branch lines, wherein in the case where the current flowing at the downstream side of the filter circuit, detected by the third detection circuit, is larger than a predetermined value, which is preliminarily set, the power source relay is made to operate so as to cut off the one of the re-branch lines.

5. The electric power steering apparatus according to claim 4, wherein the third detection circuit is formed in such a way as to detect not the current but a voltage at a position at the downstream side of and immediately after the filter circuit or a voltage to be supplied to the inverter circuit, and wherein in the case where the voltage at a position at the downstream side of and immediately after the filter circuit or the voltage to be supplied to the inverter circuit, detected by the third detection circuit, is larger than a predetermined value, which is preliminarily set, the power source relay is made to operate so as to cut off the one of the re-branch lines.

6. The electric power steering apparatus according to claim 2, further including a third detection circuit that detects a current flowing at the downstream side of the filter circuit in the one of the re-branch lines, wherein in the case where the current flowing at the downstream side of the filter circuit, detected by the third detection circuit, is larger than a predetermined value, which is preliminarily set, the power source relay is made to operate so as to cut off the one of the re-branch lines.

7. The electric power steering apparatus according to claim 6,
wherein the third detection circuit is formed in such a way as to detect not the current but a voltage at a position at the downstream side of and immediately after the filter circuit or a voltage to be supplied to the inverter circuit, and
wherein in the case where the voltage at a position at the downstream side of and immediately after the filter circuit or the voltage to be supplied to the inverter circuit, detected by the third detection circuit, is larger than a predetermined value, which is preliminarily set, the power source relay is made to operate so as to cut off the one of the re-branch lines.

8. The electric power steering apparatus according to claim 2, further including a fourth detection circuit that detects a current to be supplied from the inverter circuit to the armature winding of the electric motor or a voltage at a winding terminal of the armature winding of the electric motor, wherein in the case where the current to be supplied to the armature winding of the electric motor or the voltage at a winding terminal of the armature winding of the electric motor, detected by the fourth detection circuit, is larger than a predetermined value, which is preliminarily set, the power source relay is made to operate so as to cut off the one of the re-branch lines.

9. The electric power steering apparatus according to claim 2,
wherein the electric motor and the controller are arranged concentrically with each other in the axle direction,
wherein the power-source connector is disposed at the axle-direction end portion, at the anti-electric-motor side, of the controller,
wherein at a position in the axle-direction vicinity of the position where the power-source connector is disposed, the power source relay, the first detection circuit, and the filter circuit are arranged in the controller, and
wherein the CPU and the inverter circuit are arranged at the electric-motor side of the power source relay, the first detection circuit, and the filter circuit.

10. The electric power steering apparatus according to claim 1, further including a second detection circuit that detects a current flowing in the one of the re-branch lines, wherein in the case where the current detected by the second detection circuit is larger than a predetermined value, which is preliminarily set, the power source relay is made to operate so as to cut off the one of the re-branch lines.

11. The electric power steering apparatus according to claim 10, further including a third detection circuit that detects a current flowing at the downstream side of the filter circuit in the one of the re-branch lines, wherein in the case where the current flowing at the downstream side of the filter circuit, detected by the third detection circuit, is larger than a predetermined value, which is preliminarily set, the power source relay is made to operate so as to cut off the one of the re-branch lines.

12. The electric power steering apparatus according to claim 11,
wherein the third detection circuit is formed in such a way as to detect not the current but a voltage at a position at the downstream side of and immediately after the filter circuit or a voltage to be supplied to the inverter circuit, and
wherein in the case where the voltage at a position at the downstream side of and immediately after the filter circuit or the voltage to be supplied to the inverter circuit, detected by the third detection circuit, is larger than a predetermined value, which is preliminarily set, the power source relay is made to operate so as to cut off the one of the re-branch lines.

13. The electric power steering apparatus according to claim 10, further including a fourth detection circuit that detects a current to be supplied from the inverter circuit to the armature winding of the electric motor or a voltage at a winding terminal of the armature winding of the electric motor, wherein in the case where the current to be supplied to the armature winding of the electric motor or the voltage at a winding terminal of the armature winding of the electric motor, detected by the fourth detection circuit, is larger than a predetermined value, which is preliminarily set, the power source relay is made to operate so as to cut off the one of the re-branch lines.

14. The electric power steering apparatus according to claim 10,
wherein the electric motor and the controller are arranged concentrically with each other in the axle direction,
wherein the power-source connector is disposed at the axle-direction end portion, at the anti-electric-motor side, of the controller,
wherein at a position in the axle-direction vicinity of the position where the power-source connector is disposed, the power source relay, the first detection circuit, and the filter circuit are arranged in the controller, and
wherein the CPU and the inverter circuit are arranged at the electric-motor side of the power source relay, the first detection circuit, and the filter circuit.

15. The electric power steering apparatus according to claim 1, further including a third detection circuit that detects a current flowing at the downstream side of the filter circuit in the one of the re-branch lines, wherein in the case where the current flowing at the downstream side of the filter circuit, detected by the third detection circuit, is larger than a predetermined value, which is preliminarily set, the power source relay is made to operate so as to cut off the one of the re-branch lines.

16. The electric power steering apparatus according to claim 15,
wherein the third detection circuit is formed in such a way as to detect not the current but a voltage at a position at the downstream side of and immediately after the filter circuit or a voltage to be supplied to the inverter circuit, and wherein in the case where the voltage at a position at the downstream side of and immediately after the filter circuit or the voltage to be supplied to the inverter circuit, detected by the third detection circuit, is larger than a predetermined value, which is preliminarily set, the power source relay is made to operate so as to cut off the one of the re-branch lines.

17. The electric power steering apparatus according to claim 15, further including a fourth detection circuit that detects a current to be supplied from the inverter circuit to the armature winding of the electric motor or a voltage at a winding terminal of the armature winding of the electric motor, wherein in the case where the current to be supplied to the armature winding of the electric motor or the voltage at a winding terminal of the armature winding of the electric motor, detected by the fourth detection circuit, is larger than a predetermined value, which is preliminarily set, the power source relay is made to operate so as to cut off the one of the re-branch lines.

18. The electric power steering apparatus according to claim 15,
wherein the electric motor and the controller are arranged concentrically with each other in the axle direction,
wherein the power-source connector is disposed at the axle-direction end portion, at the anti-electric-motor side, of the controller,
wherein at a position in the axle-direction vicinity of the position where the power-source connector is disposed, the power source relay, the first detection circuit, and the filter circuit are arranged in the controller, and
wherein the CPU and the inverter circuit are arranged at the electric-motor side of the power source relay, the first detection circuit, and the filter circuit.

19. The electric power steering apparatus according to claim 1, further including a fourth detection circuit that detects a current to be supplied from the inverter circuit to the armature winding of the electric motor or a voltage at a winding terminal of the armature winding of the electric motor, wherein in the case where the current to be supplied to the armature winding of the electric motor or the voltage at a winding terminal of the armature winding of the electric motor, detected by the fourth detection circuit, is larger than a predetermined value, which is preliminarily set, the power source relay is made to operate so as to cut off the one of the re-branch lines.

20. The electric power steering apparatus according to claim 1,
wherein the electric motor and the controller are arranged concentrically with each other in the axle direction,
wherein the power-source connector is disposed at the axle-direction end portion, at the anti-electric-motor side, of the controller,
wherein at a position in the axle-direction vicinity of the position where the power-source connector is disposed, the power source relay, the first detection circuit, and the filter circuit are arranged in the controller, and
wherein the CPU and the inverter circuit are arranged at the electric-motor side of the power source relay, the first detection circuit, and the filter circuit.

\* \* \* \* \*